United States Patent Office 3,538,184
Patented Nov. 3, 1970

3,538,184
ADDUCTS OF POLYEPOXIDES AND ALKYL-SUBSTITUTED HEXAMETHYLENE DIAMINE
Alfred Heer, Basel, Switzerland, assignor to Ciba Limited, Basel, Switzerland, a company of Switzerland
No Drawing. Filed Nov. 28, 1967, Ser. No. 686,335
Claims priority, application Switzerland, Dec. 2, 1966, 17,270/66
Int. Cl. C08g 45/00
U.S. Cl. 260—830
6 Claims

ABSTRACT OF THE DISCLOSURE

Process for the manufacture of new, solvent-free, liquid adducts of polyepoxides and polyamines, which are suitable for use as curing agents for epoxy resins, characterized in that (1) a polyglycidyl ether, which is liquid at room temperature, of a polyphenol or polyalcohol is reacted with (2) hexamethylenediamine or a hexamethylenediamine whose polymethylene chain is alkyl-substituted, in which the amino groups are linked with primary carbon atoms, at a ratio of 3 to 12, preferably using about 5 amine group equivalents of the diamine (2) for every 1 epoxide group equivalent of the polyglycidyl ether (1), in the absence of solvents, at an elevated temperature.

---

It is known, for example from British specification 691,543, that adducts can be manufactured from solutions of aliphatic polyamines and solutions of solid epoxy resins in organic solvents, using at least 1.8 equivalents of an aliphatic polyamine for every epoxide equivalent of a polyepoxide or epoxy resin, and allowing the two ingredients to react at an elevated temperature. After having removed the solvent and the unreacted excess of polyamine, resinous adducts are obtained which are solid at room temperature. These known, solid, isolated adducts are dissolved in organic solvents and, if required, mixed with solutions of epoxy resins to form lacquer products ready for use.

The processing of lacquers containing solvents involves a series of disadvantages such as flammability, physiological inacceptability in their application and loss of relatively costly solvents. Therefore, Austrian specification 243,517 proposed solvent-free lacquer systems and stated that the direct industrial manufacture of solvent-free adducts is impossible because of the very violent exothermic reaction between solvent-free liquid epoxy resin component and liquid solvent-free aliphatic polyamine component with the conventional aliphatic polyamines, for example ethylenediamine, diethylenetriamine or triethylenetetramine. To overcome this difficulty it is therefore further proposed in Austrian specification 243,517 to use solvent-free adducts from epoxy resins and polyaminoamides and/or polyamino-imidazolines. However, this type of adduct has the serious technical disadvantage that they are not sufficiently reactive when used as curing agents for epoxy resins at low temperatures so that the resin+curing agent mixtures do not undergo sufficient curing at lower temperatures.

It has now been found that these disadvantages can be overcome by using for the curing of epoxy resins novel solvent-free adducts from liquid polyglycidyl ethers of polyphenols or polyalcohols and from hexamethylenediamine or alkyl-substituted hexamethylenediamines whose amino groups are linked with primary carbon atoms, or mixtures of hexamethylenediamine and such alkyl-substituted hexamethylenediamines, at a ratio epoxy resin:diamine compound varying from ⅓ to ½, preferably ⅕, epoxide equivalent per amine equivalent. The said novel adducts are accessible in a solvent-free phase by adding per epoxide equivalent of the liquid polyglycidyl ether, especially an alkaline condensation product, consisting predominantly of bisphenol A-diglycidyl ether, obtained from bisphenol A and a large stoichiometric excess of epichlorohydrin, between 3 and 12, preferably 5 equivalents of one of the diamines mentioned above. The adduct formed remains dissolved in the existing excess of diamine, the terminal viscosity remains constant and disturbing crosslinking reactions intervene only to an insignificant extent. It is not necessary to dissipate the heat of reaction since when the reaction is kept adiabatic a temperature is just reached at which the reaction is complete after a short time.

Accordingly, the present invention provides novel solvent-free adducts, suitable as curing agents for epoxy resins, prepared from (1) a polyglycidyl ether, which is liquid at room temperature, of a polyphenol or polyalcohol, and (2) hexamethylenediamine or a hexamethylenediamine having an alkyl-substituted polymethylene chain, in which the amino groups are linked with primary carbon atoms, using for the additive reaction 3 to 12, preferably about 5, amine group equivalents of the diamine (2) for every 1 epoxide group equivalent of the polyglycidyl ether (1).

According to this invention the novel adducts are manufactured by (1) reacting a polyglycidyl ether, which is liquid at room temperature, of a polyphenol or polyalcohol with (2) hexamethylenediamine or a hexamethylenediamine whose polymethylene chain is alkyl-substituted, in which the amino groups are linked with primary carbon atoms, at a ratio of 3 to 12, preferably about 5, amino group equivalents of the diamine (2) for every 1 epoxide group equivalent of the polyglycidyl ether (1), in the absence of solvents, with heating. The polyglycidyl ethers which are liquid at room temperature, i.e., at 25° C., may be derived from glycols such as ethyleneglycol, 1,4-butanediol, 1,6-hexanediol and especially from polyhydric phenols or polyphenols such as resorcinol, phenol-formaldehyde condensates of the resole or novolak type, bis-(p-hydroxyphenyl)methane and especially bis-(p-hydroxyphenyl)dimethylmethane (=bisphenol A).

In this connection there may be specially mentioned the polyglycidyl ethers of bisphenol A, which are liquid at room temperature, contain 3.8–5.8 epoxide equivalents per kg., and correspond to the average formula

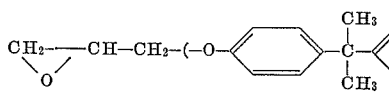 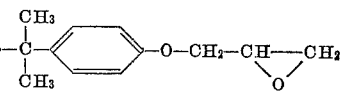

in which z is a small fractional number from 0 to 0.65.

The adducts may be formed not only with hexamethylenediamine itself but preferably also with 1,6-diamino-2,2,4-trimethylhexane, 1,6 - diamino-2,4,4-trimethylhexane or in particular commercial mixtures of these two isomers. Furthermore, there may be mentioned β-methylhexamethylenediamine, γ - methylhexamethylenediamine, 2,3-, 2,4-, 2,5- and 3,4-dimethylhexamethylenediamine.

If necessary, the liquid adduct curing agent may contain further additives such as levelling agents (for example urea-formaldehyde resins or silicone resins), curing accelerators such as phenols or polyphenols, and, if desired, viscosity reducers. Quite apart from these there may be added other curing agents, for example 2,4,6-tri-(dimethylaminomethyl)phenol to promote curing at low temperatures. In the manufacture of the liquid adducts according to this invention it is essential that the adduct should be formed in the above-specified excess of the diamine so that it remains dissolved in the diamine at usefully low viscosities and crosslinking reactions are practically obviated. However, if desired, some or all of the excessive amine may be distilled out of the finished adduct and the partially or wholly isolated adduct may be redissolved in another diamine or in a mixture of diamines.

The term "solvent-free" is used here as is usual in lacquer chemistry, the "solvents" being exclusively substances that are inert towards the lacquer components so that in general they evaporate during the film formation. Liquid polyamines or other liquid curing agents which on combined application with the adducts of this invention form homogeneous solutions with these adducts, and which during the curing reaction with the epoxy resin form crosslinked, insoluble and infusible products, or are film forming in this reaction, are not included in the term "solvents" as intended by this definition.

To prepare solvent-free lacquers and coatings the liquid adducts obtained by the process of this invention may be mixed with an equivalent proportion of liquid epoxy resin. As such liquids epoxy resins there are suitable, for example, cycloaliphatic epoxy resins such as vinylcyclohexene dioxide, limonen dioxide, 3,4-epoxycyclohexylmethyl-3,4-epoxycyclohexane carboxylate, 3,4 - epoxy-6-methylcyclohexylmethyl-3,4 - epoxy-6-methylcyclohexane carboxylate and 3,4-epoxyhexahydrobenzal-3,4-epoxycyclohexane-1,1-dimethanol; polyglycidyl esters such as tetrahydrophthalic acid diglycidyl ester and hexahydrophthalic acid diglycidyl ester and the identical liquid polyglycidyl ethers of polyphenols and polyalcohols, mentioned above as suitable starting materials for the manufacture of the adducts. The liquid epoxy resins may also be modified by addition of active diluents, for example butylglycide or cresylglycide.

The amine adducts manufactured according to this invention are not only simpler to manufacture but have also further advantages and improved properties compared with the hitherto known and used curing agents for solvent-free systems based on liquid epoxy resins. The viscosity of the curable systems at room temperature is lower, the fully cured films are practically colourless, very glossy and their shade is not altered by the action of chemicals on them. The coatings display excellent fastness to light. Curing is possible also at low temperatures, for example at $+5°$ C., and in highly humid conditions. The films show no signs of exudation or other defects on their surface. The flexibility and adhesion of the fully cured films on iron and concrete is good. The new adducts do not tend to crystallize even at low temperatures.

The solvent-free curable systems consisting of the adducts of this invention and liquid epoxy resins may contain further conventional additives such as fillers, pigments, dyestuffs or plasticizers. They may be used not only as lacquers and for coating but also as adhesives or impregnating, dipping or casting resins, especially in the electrical industry.

Percentages in the following examples are by weight.

EXAMPLE 1

158 parts by weight of commercial trimethylhexamethylenediamine (mixture of isomers of 1,6-diamino-2,2,4-trimethylhexane and 1,6-diamino-2,4,4-trimethylhexane) are mixed with 77 parts by weight of a polyglycidyl ether, which is liquid at room temperature and has been obtained by condensing bisphenol A with epichlorohydrin in the presence of alkali (containing 5.2 epoxide equivalents per kg.; viscosity 8000 to 16,000 centipoises at 25° C.) [=polyglycidyl ether A]. The mixture is heated until an exothermic reaction sets in and the temperature is raised to 110–120° C. The batch is cooled to about 100° C. and 39 parts by weight of phenol (as accelerated) are stirred in. Yield: 274 parts by weight of a liquid, storable adduct having the following properties: Viscosity about 3000 centipoises at 25° C.; colour Gardner (40% in methylglycol): about 1. The adduct contains a proportion of reaction accelerator and is particularly suitable for quick-hardening, solvent-free lacquers. 1 kilogram of this adduct, mixed with 13.1 epoxide equivalents of liquid polyglycidyl ether A, furnishes a solvent-free lacquer ready for immediate use.

EXAMPLE 2

In the same manner as in Example 1 an adduct is prepared from 158 parts by weight of commercial trimethylhexamethylene-diamine (isomer mixture) and 58 parts by weight of the polyglycidyl ether A used in Example 1, and 30 parts by weight of bisphenol A are added as accelerator. Yield: 246 parts by weight of a liquid, storable product having the following properties: Viscosity: about 3000 centipoises at 25° C.; colour Gardner (40% in methylglycol): about 1; containing about 8 amine group equivalents per kg. 1 kilogram of this adduct, mixed with 15 epoxide equivalents of liquid polyglycidyl ether A, furnishes a solvent-free lacquer.

EXAMPLE 3

95 parts by weight of the liquid polyglycidyl ether A used in Example 1 are introduced into 300 parts by weight of fused hexamethylenediamine, and the whole is heated until an exothermic reaction sets in which causes the temperature to rise to 110–120° C. After the reaction 235 parts by weight of excess hexamethylenediamine are distilled off under vacuum, to furnish 160 parts by weight of a very highly viscous adduct containing 6.8 amine group equivalents per kg. While still hot, this adduct is diluted with 80 parts by weight of commercial trimethylhexamethylenediamine (isomer mixture as in Example 1). Yield: 240 parts by weight of a liquid, storable adduct having the following properties: Viscosity about 2000 centipoises at 25° C.; colour Gardner (40% in methylglycol) about 2; containing about 8.8 amine group equivalents per kg. 1 kilogram of this adduct, mixed with 15.6 epoxide equivalents of liquid polyglycidyl ether A, furnishes a solvent-free lacquer.

EXAMPLE 4

The adduct of Example 3 is mixed with 40 parts by weight of phenol as reaction accelerator, whereupon it is particularly suitable for use as a curing agent for quick-hardening solvent-free lacquers based on epoxy resins. 1 kilogram of the accelerated adduct, mixed with 13.4 epoxide equivalents of liquid polyglycidyl ether A, furnishes a solvent-free coating composition.

EXAMPLE 5

As described in Example 1 a product was prepared from 24.5 parts by weight of commercial trimethyl-hexamethylenediamine (isomer mixture) and 10 parts by weight of 1,4-butanediol-diglycidyl ether (containing about 7.5 epoxide equivalents per kg.), to yield 34.5 parts by weight of a liquid, storable adduct having the following properties: Viscosity about 1350 centipoises at 25° C.; containing about 9 amine group equivalents per kg. 1 kilogram of this adduct, mixed with 15.8 epoxide equivalents of liquid polyglycidyl ether A, furnishes a solvent-free lacquer.

EXAMPLE 6

The adduct of Example 5 is mixed with 5.5 parts by weight of bisphenol A as curing accelerator, whereupon it is a particularly valuable curing agent for quick-hardening solvent-free lacquers based on epoxy resins. The viscosity of the resulting product is about 8000 centipoises at 25° C., and it contains about 7.7 amine group equivalents per kg. 1 kilogram of this accelerated adduct, mixed with indentation value according to Erichsen after 7 days is 2 mm. When the films are cured at +5° C., the complete hardening takes about 30 hours.

EXAMPLE 15

285 parts by weight of the adduct curing agent described in Example 6 are mixed with 715 parts by weight of the liquid polyglycidyl ether A used in Example 1 (containing 5.2 epoxide equivalents per kg.). This mixture has a pot life of 30 minutes, hardens through at 20° C. and 65% room humidity within 4 hours or at +5° C. within 32 hours.

After 1 day at 20° C. the films reveal a pendulum hardness according to Persoz of 210 seconds and after 7 days of 256 seconds. The indentation value according to Erichsen is 5.1 mm. after 7 days. The chemical stability is equal to that of the formulation of Example 9. The above mixture can be pigmented with various pigments and fillers.

EXAMPLE 16

In the course of 60 minutes at 80 to 90° C., 94 parts by weight of a polyglycidyl ether, which is liquid at room temperature and has been obtained by condensing bisphenol A in the presence of alkali (containing 5.45 epoxide equivalents per kg.; viscosity about 9000 centipoises at 25° C.), are introduced into a homogeneous melt of 164 parts by weight of hexamethylenediamine and 95 parts by weight of bisphenol A. The whole is stirred on for 30 minutes at 110–120° C. and 44 parts by weight of trimethylhexamethylenediamine (isomer mixture as in Example 1) are added. Yield: 397 parts by weight of a liquid, storable, non-crystallizing adduct having the following properties: Viscosity at 25° C. about 3400 centipoises; containing about 8.4 amine equivalents per kg. 1 kilogram of this adduct, on being mixed with 15.7 epoxide equivalents of a liquid epoxy resin, furnishes solvent-free coatings which, if desired, may be modified with fillers and colour pigments and which harden completely at room temperature.

I claim:
1. A solvent-free, liquid adduct which is suitable as curing agent for 1,2-epoxy resins, said adduct being prepared by heating a blend of (1) a ployglycidyl ether, which is liquid at room temperature, and which is a member selected from the group consisting of a polyphenol polyglycidyl ether and polyalcohol polyglycidyl ether, and (2) a hexamethylene diamine whose polymethylene chain is alkyl-substituted and in which the amino groups are linked with primary carbon atoms, with the proviso that in the blend used for the adduct formation 3 to 12 amine group equivalents of the diamine (2) are present for one epoxide group equivalent of the polyglycidyl ether (1).

2. An adduct according to claim 1, where the diamine (2) used in the adduct formation is an isomer mixture of 1,6-diamino-2,2,4-trimethylhexane and 1,6-diamino-2,4,4-trimethylhexane.

3. An adduct according to claim 1, wherein the polyglycidyl ether (1) used in the adduct formation is a polyglycidyl ether, which is liquid at room temperature, of bis(p-hydroxyphenyl)dimethylmethane.

4. An adduct according to claim 1 which is formed from a blend where about 5 amine group equivalents of the diamine (2) are present for one epoxide group equivalent of the polyglycidyl ether (1).

5. A curable composition of matter which comprises (a) a liquid 1,2-epoxy resin which is liquid at room temperature and (b) as curing agent, a solvent-free liquid adduct prepared by heating a blend of (1) a polyglycidyl ether which is liquid at room temperature, and which is a member selected from the group consisting of a polyphenol polyglycidyl ether and polyalcohol polyglycidyl ether, and (2) a member selected from the group consisting of hexamethylenediamine and a hexymethylenediamine whose polymethylene chain is alkyl-substituted and in which the amino groups are linked with primary carbon atoms, with the proviso that in the blend used for the adduct formation 3 to 12 amine group equivalents of the diamine (2) are present for one epoxide group equivalent of the polyglycidyl ether (1).

6. A curable composition according to claim 5, which contains as further ingredient a phenol as curing accelerator.

References Cited

UNITED STATES PATENTS

| | | | |
|---|---|---|---|
| 2,500,600 | 3/1950 | Bradley | 260—47 |
| 2,585,115 | 2/1952 | Greenlee | 260—47 |
| 2,865,888 | 12/1958 | Greenlee | 260—47 |
| 2,912,389 | 11/1959 | Phillips | 260—47 |
| 2,909,448 | 10/1959 | Schroeder | 260—47 |
| 2,982,752 | 5/1961 | Phillips | 260—830 |
| 3,023,190 | 2/1962 | Damusis | 260—830 |
| 3,141,825 | 7/1964 | Goldemberg | 260—830 |
| 3,315,035 | 4/1967 | Applegarth | 260—830 |
| 3,420,794 | 1/1969 | May | 260—830 |

FOREIGN PATENTS

| | | |
|---|---|---|
| 691,543 | 5/1953 | Great Britain. |
| 790,083 | 2/1958 | Great Britain. |
| 952,842 | 3/1964 | Great Britain. |

PAUL LIEBERMAN, Primary Examiner

U.S. Cl. X.R.

260—2, 31.8, 37, 47, 824, 834; 117—123, 132, 148

13.5 epoxide equivalents of liquid polyglycidyl ether A, furnishes a solvent-free coating composition.

EXAMPLE 7

As described in Example 1 an adduct was manufactured from 19 parts by weight of commercial trimethyl-hexamethylenediamine (isomer mixture) and 10 parts by weight of 1,6-hexanediol-diglycidyl ether (containing about 7.3 epoxide equivalents per kg.), to yield 29 parts by weight of a liquid, storable adduct having the following properties: Viscosity about 3200 centipoises; colour Gardner about 5; containing about 8.3 amine group equivalents per kg. 1 kilogram of this adduct, mixed with 14 parts by weight of liquid polyglycidyl ether A, furnishes a solvent-free lacquer.

EXAMPLE 8

The adduct obtained in Example 7 is mixed with 4.8 parts by weight of phenol as curing accelerator. The resulting product is particularly suitable for curing quick-hardening, solvent-free lacquers based on epoxy resins. Its viscosity is about 3300 centipoises and it contains about 7.1 amine equivalents per kg. 1 kilogram of this adduct, mixed with 12 epoxide equivalents of liquid polyglycidyl ether A, furnishes a solvent-free lacquer.

EXAMPLE 9

244.0 parts by weight of the adduct curing agent described in Example 1 are mixed with 680 parts by weight of the liquid polyglycidyl ether A used in Example 1. To improve the flow properties 76.0 parts by weight of n-butanol are added. This mixture has a viscosity of 1400 centipoises at 25° C. according to Hoeppler and a pot life of about 24 minutes.

Bright, colourless coatings produced with this mixture display a dry film thickness of 160 to 180μ and at 20° C. and 65% relative humidity they take 12 hours to become dust-dry. After 3 hours the surface of the films is no longer tacky and hardened through without defects in the film. After 1 day the films display a Persoz pendulum hardness of 205" and after 7 days of about 315". The indentation values according to Erichsen of the films after 7 days are 7.6 mm and after ageing at 60° C. for another 7 days still 5.6 mm. When the films are cured at +5° C., they are hardened through after about 28 hours.

After 7 days' curing the coating is resistant for over 2 months against 70% sulphuric acid, concentrated ammonia, leaded petrol and water. After 2 months signs of a slight attack on the film surface are found with concentrated hydrochloric acid and 95% ethanol.

EXAMPLE 10

581.0 parts by weight of an unmodified, medium viscous polyglycidyl ether, obtained by condensing bisphenol A with epichlorohydrin in the presence of alkali, containing 5.5 epoxide equivalents per kg. and having a viscosity of 8000 to 12,000 centipoises at 25° C. [=polyglycidyl ether B] are mixed with 175.0 parts by weight of titanium dioxide (rutile modification) and 46.5 parts by weight of diacetone alcohol and homogenized on a three-roll mixer. This white-pigmented resin component is mixed with 197.5 parts by weight of the adduct curing agent described in Example 1 and used as a lacquer.

The lacquer mixture has a pot life of 30 minutes. The lacquer films take 7 hours to become dust-dry; after 6 hours they are hardened through. The pendulum hardness according to Persoz is at 20° C. and 65% room humidity (180μ thickness of dry layer) after 1 day 72 seconds and about 250 seconds after 7 days. The indentation according to Erichsen of the films is 5.1 mm. after 7 days. The coatings have a smooth surface without any film defects and without appreciable signs of yellowing and have high gloss values of about 100 (photovolt). The chemical stability of the films is the same as that of the film of Example 9.

EXAMPLE 11

254 parts by weight of the adduct curing agent described in Example 2 are mixed with 746 parts by weight of an unmodified, low-viscous polyglycidyl ether, prepared by condensing bisphenol A with epichlorohydrin in the presence of alkali, containing 5.6 epoxide equivalents per kg., viscosity 5000 to 6400 centipoises at 25° C. [=polyglycidyl ether C]. The mixture has a pot life of 22 minutes, turns dust-dry after 35 hours and is hard right through after 2 hours.

The hardened coating is clear, light-coloured and glossy and has good stability towards chemical agents and mechanical stresses.

The above resin+curing agent mixture can be pigmented with various pigments and fillers. Depending on the degree of pigmentation, the resulting coating has a high gloss, does not yellow and adheres firmly to wood, metal and masonry.

EXAMPLE 12

To manufacture a self-levelling flooring 166.6 parts by weight of a low-viscous polyglycidyl ether, modified with n-butylglycide as reactive diluent, obtained by condensing bisphenol A with epichlorohydrin in the presence of alkali (containing 5.0 epoxide equivalents per kg.; viscosity 480–540 centipoises at 25° C.) [=polyglycidyl ether D] and 58.4 parts by weight of the adduct curing agent described in Example 1 are mixed with 25.0 parts by weight of toluene, 283.0 parts by weight of quartz sand (grain size 0.1 to 0.7 mm.), 283.0 parts by weight of quartz sand (grain size 0.1–0.3 mm.) and 1840 parts by weight of quartz meal are mixed, preferably in a vacuum mixer.

The above mixture is applied with a spatula or by means of a machine in a layer 2 to 3 mm. thick to a previously cleaned concrete surface. The coating levels out well. After curing for 1 day at 20° C. and 65% room humidity it has a smooth surface. After 7 days curing, the coating material has a compressive strength (VSM 77 102) of 4.5 kiloponds/mm.$^2$, a dielectric loss factor $tg\delta$ (DIN 53 483) of $12\times10^{-2}$ and a specific ohmic resistance (DIN 53 482) of $10^{12}$ ohm$\times$cm. The coating is resistant against water, 30% sodium hydroxide solution, 5% Formalin solution and 10% acetic acid for over 2 months.

EXAMPLE 13

411.0 parts by weight of a low-viscous polyglycidyl ether, modified with dibutylphthalate as plasticizer, prepared by condensing bisphenol A with epichlorohydrin in the presence of alkali (containing 5.2 epoxide equivalents per kg.; viscosity 700–1100 centipoises at 25° C.) [=polyglycidyl ether E] are mixed with 13.7 parts by weight of silica having a large specific surface (registered trade name Aerosil) and turned into a paste on a roller mixer. 411.0 parts by weight of a liquid coal tar and 164.0 parts by weight of the adduct curing agent of Example 1 are added to this paste. This mixture has a pot life of 45 minutes. It can be applied by brushing or with a 2-component spraygun to horizontal or vertical surfaces, to steel or concrete surfaces and preferably to concrete pipes.

The resulting tar coating turns dust-dry after 3¼ hours at 20° C.

EXAMPLE 14

248 parts by weight of the adduct curing agent of Example 3 are mixed with 752 parts by weight of the liquid polyglycidyl ether A used in Example 1 (containing 5.2 epoxide equivalents per kg.). This mixture has a pot life of 40 to 45 minutes and is dust-dry after 48 hours.

Bright, colourless coatings produced with this mixture and which have a dry film thickness of 200μ at 20° C. and 65% room humidity, harden right through within 2 hours and reveal after 1 day a Persoz pendulum hardness of 217" and after 7 days of 285 seconds. The

CASE 6065/E

PO-1050
(5/69)

UNITED STATES PATENT OFFICE
CERTIFICATE OF CORRECTION

Patent No. 3,538,184        Dated November 3, 1970

Inventor(s) ALFRED HEER

It is certified that error appears in the above-identified patent and that said Letters Patent are hereby corrected as shown below:

Column 8, lines 20 to 21, delete "a member selected from the group consisting of hexamethylenediamine and".

Signed and sealed this 18th day of May 1971.

(SEAL)
Attest:

EDWARD M. FLETCHER, JR.
Attesting Officer

WILLIAM E. SCHUYLER, JR
Commissioner of Patents